(12) United States Patent
Watanabe

(10) Patent No.: US 8,144,418 B2
(45) Date of Patent: Mar. 27, 2012

(54) TEST DEVICE FOR MAGNETIC STORAGE DEVICE, MAGNETIC STORAGE DEVICE, AND METHOD OF MANUFACTURING MAGNETIC STORAGE DEVICE

(75) Inventor: Daisuke Watanabe, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 92 days.

(21) Appl. No.: 12/645,357

(22) Filed: Dec. 22, 2009

(65) Prior Publication Data
US 2010/0157455 A1 Jun. 24, 2010

(30) Foreign Application Priority Data
Dec. 24, 2008 (JP) .................. 2008-327205

(51) Int. Cl.
*G11B 21/02* (2006.01)
(52) U.S. Cl. .................. 360/75; 360/31; 360/59; 360/62
(58) Field of Classification Search .................. None
See application file for complete search history.

(56) References Cited

U.S. PATENT DOCUMENTS

| | | | |
|---|---|---|---|
| 7,239,471 B2 * | 7/2007 | Tanabe ........................ | 360/75 |
| 7,835,104 B2 * | 11/2010 | Yamashita et al. ........... | 360/75 |
| 2001/0013985 A1 | 8/2001 | Baba et al. | |
| 2007/0133118 A1 * | 6/2007 | Kajitani ....................... | 360/75 |
| 2007/0230034 A1 * | 10/2007 | Kondo ......................... | 360/78.04 |
| 2008/0002271 A1 * | 1/2008 | Yun et al. ..................... | 360/53 |
| 2008/0049351 A1 * | 2/2008 | Yamanaka et al. ........... | 360/59 |
| 2008/0100965 A1 * | 5/2008 | Oki .............................. | 360/234.3 |
| 2008/0225430 A1 * | 9/2008 | Kawamoto et al. .......... | 360/75 |
| 2008/0247079 A1 | 10/2008 | Satoh et al. | |
| 2008/0291579 A1 * | 11/2008 | Uesugi et al. ................ | 360/314 |
| 2009/0168248 A1 * | 7/2009 | Matsumoto et al. ......... | 360/235.7 |

FOREIGN PATENT DOCUMENTS

| | | |
|---|---|---|
| EP | 1 850 333 A2 | 10/2007 |
| JP | 2001-229637 A | 8/2001 |
| JP | 2007-294007 | 11/2007 |
| JP | 2009-157987 A | 7/2009 |

OTHER PUBLICATIONS

Decision of a Patent Grant mailed by Japan Patent Office on Mar. 29, 2011 in the corresponding Japanese patent application No. 2008-327205.
Prior Art Information List, (JP 2007-294007 A, Nov. 8, 2007).

* cited by examiner

*Primary Examiner* — Dismery Mercedes
(74) *Attorney, Agent, or Firm* — Knobbe, Martens, Olson & Bear LLP

(57) ABSTRACT

According to one embodiment, a test device for a storage device includes: a module configured to acquire from the storage device a value corresponding to a signal level read from a magnetic disk through a magnetic head of the storage device, at a first timing at which an initial power of 0 or greater is supplied to a heater in the head and at a second timing at which a power to the heater is returned to the initial power after the power to the heater has been increased from the initial power, a periphery of a head element in the head has been expanded by the heater, and the element has been protruded toward a magnetic disk side; and a determiner configured to determine whether plastic deformation has occurred in the periphery of the element based on a difference between the values obtained at the first and second timings.

22 Claims, 11 Drawing Sheets

TEST DEVICE FOR MAGNETIC STORAGE DEVICE, MAGNETIC STORAGE DEVICE, AND METHOD OF MANUFACTURING MAGNETIC STORAGE DEVICE

CROSS-REFERENCE TO RELATED APPLICATIONS

This application is based upon and claims the benefit of priority from Japanese Patent Application No. 2008-327205, filed Dec. 24, 2008, the entire contents of which are incorporated herein by reference.

BACKGROUND

1. Field

One embodiment of the invention relates to a test device for a magnetic storage device comprising a magnetic disk, a magnetic storage device including the test function, and a method of manufacturing the magnetic storage device.

2. Description of the Related Art

Hard disk drives (HDD) are widely used as storage devices for computers. In order to increase the recording density of a magnetic disk in a HDD, it is important to reduce the flying height of a head element floating from a magnetic disk surface. Recently, to further reduce the flying height of the head element, a technology called dynamic flying height (DFH) has been noted. The DFH technology is characterized in that a magnetic head has a function of correcting the flying height. Specifically, a heater is incorporated near a magnetic gap of the magnetic head. When an electric power is supplied to the heater, the heater generates heat, leading to heat expansion near the magnetic gap. The heat expansion causes protrusion of the magnetic gap toward the magnetic disk surface side, and consequently the flying height is reduced.

There is a HDD that has such a DFH function and monitors a resistance value of a heater to detect degradation over time of the heater's resistance (for example, see Japanese Patent Application Publication (KOKAI) No. 2007-294007). Before shipment of the HDD, an adjustment process is performed through the DFH function to optimize the flying height of the head element. In the adjustment process, the electric power supplied to the heater is increased to bring the head element into contact with the magnetic disk surface. This operation is called "touchdown" of the head element. The electric power supplied to the heater is reduced from this state to gradually float the head element, and the electric power supplied to the heater upon reaching a desired flying height is detected and utilized as a controlled variable of the heater during normal operation.

In the magnetic head having the DFH function, the supply of excessive electric power to the heater causes plastic deformation around the head element such that the head element may not return to its original position even if the supplied electric power is reduced. For example, to perform "touchdown" of the head element in the adjustment process, a relatively high electric power is supplied to the heater. To increase the variable range of the flying height by the DFH, the maximum electric power supplied to the heater needs to be increased. However, when excessive electric power is supplied to the heater and plastic deformation is caused around the head element, it becomes impossible to float the head element normally and to use the magnetic head. To prevent this, it is preferable to be able to detect the plastic deformation around the head element, but no means have been considered to enable the detection of the plastic deformation without increasing the cost for manufacturing and components of the HDD.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
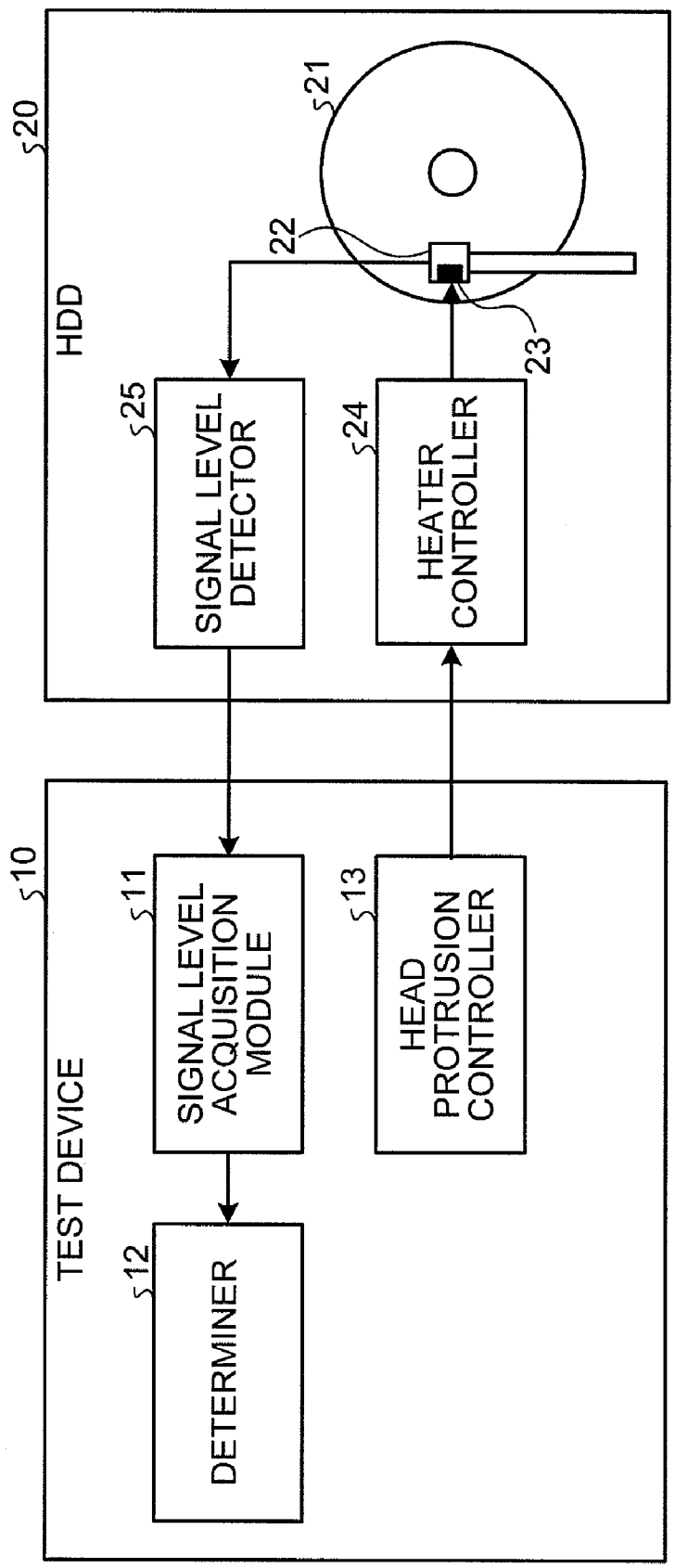
FIG. 1 is an exemplary view illustrating a constitution example of an HDD test system according to a first embodiment of the invention.

Various embodiments according to the invention will be described hereinafter with reference to the accompanying drawings. In general, according to one embodiment of the invention, a test device for a magnetic storage device, comprises: a signal level acquisition module configured to acquire from the magnetic storage device a detection value corresponding to a level of a signal read from a magnetic disk through a magnetic head of the magnetic storage device, at a first timing at which an initial electric power of a power value equal to or greater than 0 is supplied to a heater in the magnetic head and at a second timing at which the electric power supplied to the heater is returned to the initial electric power after the electric power supplied to the heater has been increased from the initial electric power, a periphery of a head element in the magnetic head has been expanded due to heating by the heater, and the head element has been protruded toward a side of the magnetic disk of the magnetic storage device; and a determiner configured to determine whether plastic deformation has occurred in the periphery of the head element based on a difference between the detection values obtained at the first and second timings.

According to another embodiment of the invention, a magnetic storage device, comprises: a signal level acquisition module configured to acquire a detection value corresponding to a level of a signal read from a magnetic disk through a magnetic head, at a first timing at which an initial electric power of a power value equal to or greater than 0 is supplied to a heater in the magnetic head and at a second timing at which the electric power supplied to the heater is returned to the initial electric power after the electric power supplied to the heater has been increased from the initial electric power, a periphery of a head element in the magnetic head has been expanded due to heating by the heater, and the head element has been protruded toward a magnetic disk side; and a determiner configured to determine whether plastic deformation has occurred in the periphery of the head element based on a difference between the detection values obtained at the first and second timings.

According to still another embodiment of the invention, a method of manufacturing a magnetic storage device, comprises assembling the magnetic storage device and testing the assembled magnetic storage device. The assembling comprises: a first acquisition of acquiring by a signal level acquisition module a detection value corresponding to a level of a signal read from a magnetic disk of the magnetic storage device through a magnetic head of the magnetic storage device at a timing at which an initial electric power of a power value equal to or greater than 0 is supplied to a heater in the magnetic head, a second acquisition of acquiring by the signal level acquisition module the detection value at which the electric power supplied to the heater is returned to the initial electric power after the electric power supplied to the heater has been increased from the initial electric power, a periphery of a head element in the magnetic head has been expanded due to heating by the heater, and the head element has been protruded toward a side of the magnetic disk, and determining by a determiner whether or not plastic deformation has occurred in the periphery of the head element based on a difference between the detection values obtained in the first and second acquisition.

First Embodiment

FIG. 1 is a view of a constitution example of an HDD test system according to a first embodiment of the invention.

A test device 10 illustrated in FIG. 1 is connected to a HDD 20 and has a function of testing the HDD 20. The test device 10 is used after the assembly process of various components of the HDD 20 in the manufacturing process of the HDD 20. In that case, the test device 10 may be realized as a dedicated device for the test of the HDD 20, or may be realized as a device performing, for example, adjustment of the inside of the HDD 20 as in a second embodiment to be described later, whereby the function of testing the HDD 20 may be added to the test device 10. Further, the test device 10 may be realized as an information processing apparatus, such as a PC (personal computer) operated as a host device of the HDD 20, in the ordinary use of the HDD 20 after production shipment. In that case, the HDD 20 may be mounted in the test device 10.

The HDD 20 is a magnetic storage device which writes a signal to a magnetic disk 21 and reads a signal from the magnetic disk 21. The HDD 20 has a so-called DFH function. Namely, a heater 23 is mounted to a magnetic head 22 of the HDD 20, and the HDD 20 comprises a heater controller 24 supplying an electric power to the heater 23. When the electric power from the heater controller 24 is supplied to the heater 23, the heater 23 is heated to expand the periphery of a head element of the magnetic head 22, and the head element is protruded toward the magnetic disk 21 side. Thus, the amount of the electric power supplied to the heater 23, and consequently the flying height of the head element floating from the magnetic disk 21 can be finely adjusted.

In the magnetic head 22, the supply of an excessive amount of electric power to the heater 23 may cause plastic deformation of the periphery of the head element in the magnetic head 22. The test device 10 can test the occurrence of the plastic deformation. The test device 10 comprises a signal level acquisition module 11 and a determiner 12 as functions for realizing the test. Meanwhile, the HDD 20 comprises a signal level detector 25.

The signal level detector 25 of the HDD 20 outputs a detection value corresponding to the level of a signal read from the magnetic disk 21 through the magnetic head 22. The signal level detector 25 may detect the level itself of the signal read by the magnetic head 22 to output the detection value. The signal level detector 25 may output a value that is changed in accordance with the level of the read signal and can enable substantial estimation of the change of the level of the read signal. As an example of the latter, a gain of VGA (Variable Gain Amp) keeping the signal, which is read from the magnetic head 22, at a fixed value is applicable. In that case, higher the level of the signal read by the magnetic head 22, the lower the gain of the VGA.

For example, the signal level detector 25 outputs a detection value corresponding to the level of a servo signal read from the magnetic disk 21. Recording data recorded in the magnetic disk 21 may be read by the magnetic head 22 based on the servo signal, and the signal level detector 25 may output the detection value corresponding to the level of the read signal at this time.

The signal level acquisition module 11 of the test device 10 obtains the detection value output from the signal level detector 25 of the HDD 20. The signal level detector 25 performs the level detection at least the following two timings, and the signal level acquisition module 11 obtains the detection value from the signal level detector 25 at each of these timings.

The first timing is a timing at which an initial electric power is supplied to the heater 23. The initial electric power is the initial value of the electric power supplied from the heater controller 24 to the heater 23 and may be a power value of "0" or a predetermined value at or above 0. When the initial electric power is supplied to the heater 23, the periphery of the head element may be in a state of being not expanded. The second timing is a timing at which the electric power supplied to the heater 23 is increased after the first timing, the head element is in a state of being protruded toward the magnetic disk 21 side, and thereafter, the electric power supplied to the heater 23 is returned to the initial electric power.

The first and second timings are preferably respectively the timings before and after the operation that a relatively large electric power can be supplied to the heater 23. Further, the first and second timings are preferably immediately before and immediately after that operation.

For example, such an operation that the electric power supplied to the heater 23 is higher than the supplied electric power in the ordinary using state of the HDD 20 is performed between the first and second timings. Such an operation includes DFH calibration. In the DFH calibration, a relatively high electric power is first supplied to the heater 23, and consequently such a touchdown operation that the head element of the magnetic head 22 is in contact with the magnetic disk 21 is performed. Further, the electric power supplied to the heater 23 is reduced until the flying height of the head element floating from the magnetic disk 21 reaches the target value from such a state that the head element performs touchdown. According to this constitution, the electric power supplied to the heater 23 in the ordinary use of the HDD 20 is correctly adjusted.

In the first embodiment, the test device 10 comprises a head protrusion controller 13, which controls the electric power supplied to the heater 23 for a period at least from the first timing to the second timing. The head protrusion controller 13 transmits a control signal to the heater controller 24 to thereby control the electric power supplied from the heater controller 24 to the heater 23. However, such a control function of the head protrusion controller 13 that the electric power supplied to the heater 23 is controlled may be provided not in the test device 10 but in the HDD 20.

The determiner 12 of the test device 10 determines the occurrence of the plastic deformation of the periphery of the head element of the HDD 20 based on the difference between the detection values obtained by the signal level acquisition module 11, respectively, at the first and second timings. For example, the determiner 12 compares the absolute value of the difference of the detection values obtained at each timing with a predetermined threshold value, and when the absolute value of the difference is more than the threshold value, the determiner 12 determines that the plastic deformation has occurred.

The occurrence of the plastic deformation of the periphery of the head element may cause the change of the distance between the head element and the magnetic disk 21. Further, the occurrence of the plastic deformation may cause the deterioration of the head element itself. Therefore, when it is in such a state that the same initial electric power is supplied to the heater 23, the level of the signal read from the magnetic disk 21 is substantially changed between before and after the occurrence of the plastic deformation of the periphery of the head element. The determiner 12 detects the level change and consequently can determine the occurrence of the plastic deformation.

According to the test device 10, the simple determination processing using the signal read from the magnetic disk 21 can enable the detection of the occurrence of the plastic deformation around the head element. Therefore, the HDD 20 with deteriorated quality can be easily found. Since the constitutions of the test device 10 and the HDD 20 themselves are not required to be substantially changed for the sake of detection of the plastic deformation, the manufacturing cost of the HDD 20 can be reduced. For example, when the determination processing is applied to the HDD 20 before product shipment, the high-quality HDD 20 can be manufactured at low cost. When the determination processing is applied to the HDD 20 after shipment, the failure of the HDD 20 due to the plastic deformation can be detected.

In the first embodiment, in the test device 10, each function of the signal level acquisition module 11, the determiner 12, and the head protrusion controller 13 can be realized by execution of a predetermined program by a CPU (Central Processing Unit) of the test device 10.

Second Embodiment

Next, an example will be more specifically described, in which the detection of the plastic deformation of the periphery of the head element is enabled in the DFH calibration at the HDD.

Figure 2:
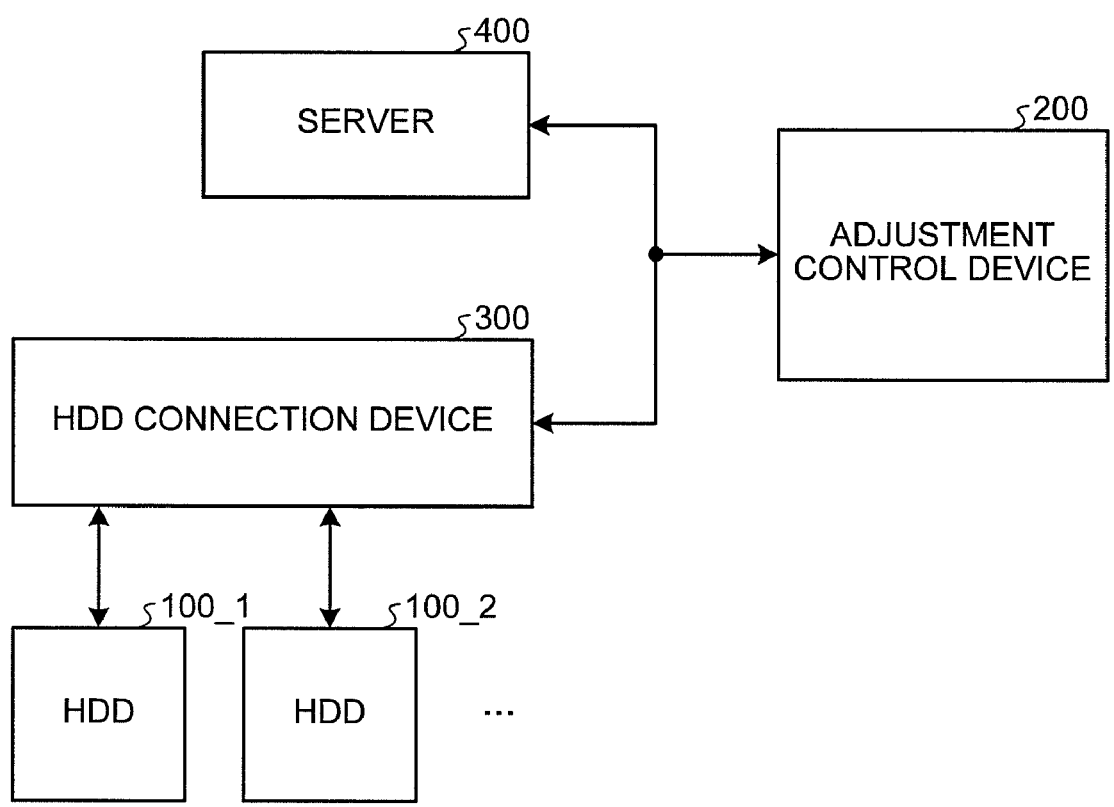
FIG. 2 is an exemplary view illustrating a constitution example of an HDD adjustment system according to a second embodiment of the invention.

FIG. 2 is a view illustrating a constitution example of an HDD adjustment system according to a second embodiment of the invention.

The HDD adjustment system illustrated in FIG. 2 can apply various adjustment operations, including the DFH calibration, to a plurality of HDDs 100_1, 100_2, and so on. The HDD adjustment system comprises an adjustment control device 200, and HDD connection device 300, and a server 400, and they are connected to each other through, for example, a communication cable.

The adjustment control device 200 is operated as a host device for operating the HDDs 100_1, 100_2, and ..., which are objects to be adjusted. The adjustment control device 200 transmits a control signal to the HDDs 100_1, 100_2, and ... through the HDD connection device 300 and consequently controls the various adjustment operations in the HDDs 100_1, 100_2, and so on. The adjustment control device 200 further has a function of evaluating the result of the adjustment operation.

The HDD connection device 300 is connected to the HDDs 100_1, 100_2, and ..., which are objects to be adjusted. The HDD connection device 300 contains the HDDs 100_1, 100_2, and ... in a chamber, for example. The HDD connection device 300 receives the control signal output from the adjustment control device 200 to transfer the control signal to the HDD to be its destination or output the response to the control signal to the adjustment control device 200.

The server 400 is a terminal controlling the overall operation of the HDD adjustment system, and has a management function for the HDD to be adjusted, a time management function for the entire system, and a function of providing a parameter used in the various adjustment operations.

Figure 3:
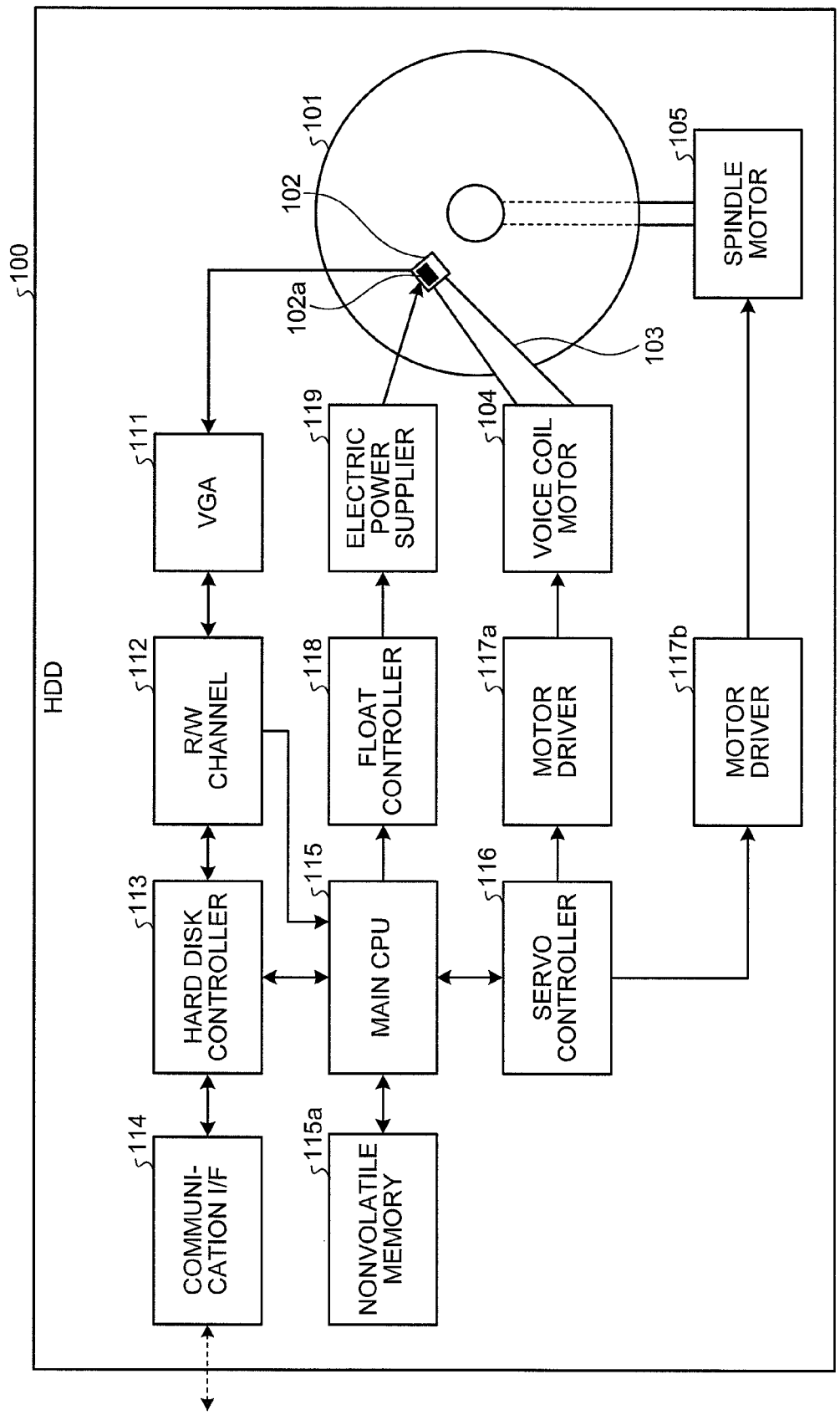
FIG. 3 is an exemplary view illustrating a hardware constitution example of the HDD.

FIG. 3 is a view illustrating a hardware constitution example of the HDD. The HDDs 100_1, 100_2, and so on to be adjusted have the same hardware constitution. In the following description, these HDDs are denoted by "HDD 100".

The HDD 100 illustrated in FIG. 3 comprises a magnetic disk 101, a magnetic head 102, a carriage arm 103, a voice coil motor 104, a spindle motor 105, VGA 111, R/W (Read/Write) channel 112, a hard disk controller 113, a nonvolatile memory 113a, a communication I/F (Interface) 114, a main CPU 115, a nonvolatile memory 115a, a servo controller 116, motor drivers 117a and 117b, a float controller 118, and an electric power supplier 119. A plurality of those hardware blocks may be mounted on one substrate.

The magnetic disk 101 is rotated by the spindle motor 105. The magnetic head 102 is supported by the carriage arm 103. The carriage arm 103 is moved by the voice coil motor 104, whereby the magnetic head 102 is positioned on the magnetic disk 101. The magnetic head 102 floats from the magnetic disk 101 accompanying the rotation of the magnetic disk 101 to write a signal to the magnetic disk 101 and read a signal from the magnetic disk 101.

A heater 102a is mounted to the magnetic head 102. As in the first embodiment, when an electric power is supplied to the heater 102a, the heater 102a is heated, whereby the periphery of the head element of the magnetic head 102 is expanded. Due to this, the head element is protruded toward the magnetic disk 101 side, and the flying height of the magnetic head 102 is finely adjusted.

The VGA 111 adjusts the level of the signal, read from the magnetic disk 101 by the magnetic head 102, in response to a gain control signal output from the R/W channel 112 and outputs the signal to the R/W channel 112.

The R/W channel 112 receives the signal, read from the magnetic disk 101 by the magnetic head 102, through the VGA 111 to modulate the signal, and, thus to generate reproduction data. The R/W channel 112 then performs error correction and thereafter outputs the reproduction data to the hard disk controller 113. In such a reproduction operation, the R/W channel 112 outputs the gain control signal to the VGA 111 in response to the level of the output signal from the VGA 111 and performs control so that the output signal from the VGA 111 is kept constant. The R/W channel 112 modulates the recording data received from the hard disk controller 113 to generate a recording data signal, and, thus, to output the recording data signal to the magnetic head 102 through the VGA 111.

The hard disk controller 113 receives the supply of the recording data to be recorded in the magnetic disk 101 from an external apparatus through the communication I/F 114. The hard disk controller 113 gives an error correction cord to the recording data to output the recording data to the R/W channel 112. The hard disk controller 113 further receives the reproduction data, which has been read from the magnetic disk 101, from the R/W channel 112 to output the reproduction data to the external apparatus through the communication I/F 114. The hard disk controller 113 has a function of transferring a control command, which has been received from the external apparatus through the communication I/F 114, to the main CPU 115 and a function of receiving response information for the control command from the main CPU 115 and transmitting the response information to the external apparatus through the communication I/F 114.

The communication I/F 114 is connected to the external apparatus through a connector (not illustrated) and transmits/receives data with the external apparatus. In the second embodiment, the communication I/F 114 is connected to the HDD connection device 300 and can transmit/receive data with the adjustment control device 200 and the server 400 through the HDD connection device 300.

The main CPU 115 controls the overall operation of the HDD 100. When the main CPU 115 receives the control command from the external apparatus through the communication I/F 114 and the hard disk controller 113, it reads a firmware corresponding to the control command from the nonvolatile memory 115a to execute the firmware. By virtue of the execution of the firmware, the operation of each module in the HDD 10 is controlled.

The firmware executed by the main CPU 115 and various data are stored in the nonvolatile memory 115a. For example, a flash memory can be utilized as the nonvolatile memory 115a. The nonvolatile memory 115a may be mounted in the main CPU 115.

The servo controller 116 outputs the control signal to the motor drivers 117a and 117b under the control of the main CPU 115 and gives an instruction for the movement of the carriage arm 103 and the rotation of the spindle motor 105. The motor drivers 117a and 117b respectively drive the voice coil motor 104 and the spindle motor 105 in accordance with the instruction from the servo controller 116.

The float controller 118 outputs the control signal to the electric power supplier 119 under the control of the main CPU 115 and controls the electric power supplied to the heater 102a. When the magnetic head 102 floats from the magnetic disk 101 in response to the rotation of the magnetic disk 101, the float controller 118 receives a control value from the main CPU 115 to output the control value to the electric power supplier 119. The control value is stored in the nonvolatile memory 115a by the DFH calibration to be described later. The electric power supplier 119 supplies to the heater 102a the electric power corresponding to the control value from the float controller 118. According to this constitution, the flying height of the magnetic head is finely adjusted so that the magnetic head is positioned at the target height, and the writing of a signal to the magnetic disk 101 and the reading of a signal from the magnetic disk 101 are executed.

Figure 4:
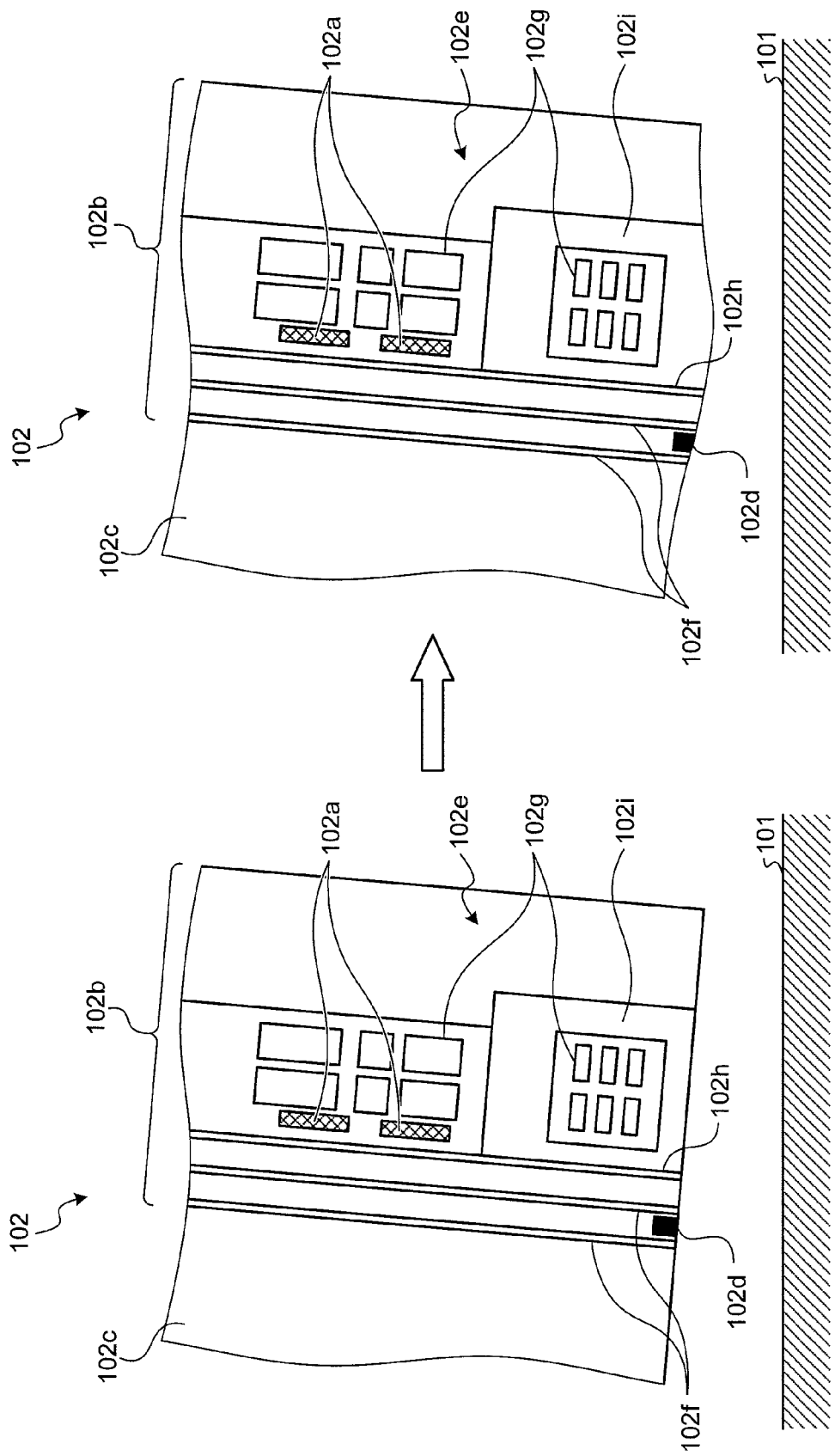
FIG. 4 is an exemplary cross-sectional view of a periphery of a head element of a magnetic head.

FIG. 4 is a cross-sectional view of the periphery of the head element of the magnetic head. The left side view of FIG. 4 illustrates the state that the magnetic head does not protrude, and the right side view illustrates the state that the magnetic head is protruded by heating of the heater 102a.

The magnetic head 102 comprises a head element portion 102b and a slider 102c supporting the head element portion 102b. The slider 102c is formed as an AlTic substrate, for example, and the head element portion 102b is formed with respect to the slider 102c by a thin-film formation process.

The head element portion 102b comprises the heater 102a, a read element 102d for reading a signal from the magnetic disk 101, and a write element 102e for writing a signal to the magnetic disk 101. The read element 102d is a magnetoresistive effect element, for example, and located between magnetic shield layers 102f. The write element 102e, for example, generates a magnetic field by an electric current flowing through a coil and is an inductive element writing magnetic data to the magnetic disk 101. The write element 102e comprises magnetic shield layers 102h and 102i. The heater 102a is formed of, for example, copper and is provided between a coil 102g and the magnetic shield layers 102h in the second embodiment. The remaining space of the head element portion 102b is covered by an insulating layer such as alumina.

As illustrated in the right side view of FIG. 4, when the heater 102a is heated by the supply of the electric power from the electric power supplier 119, the head element portion 102b is expanded, whereby the head element, that is, the read element 102d and the write element 102e are protruded toward the magnetic disk 101. Consequently, the flying height of the head element floating from the magnetic disk 101 is finely adjusted.

Figure 5:
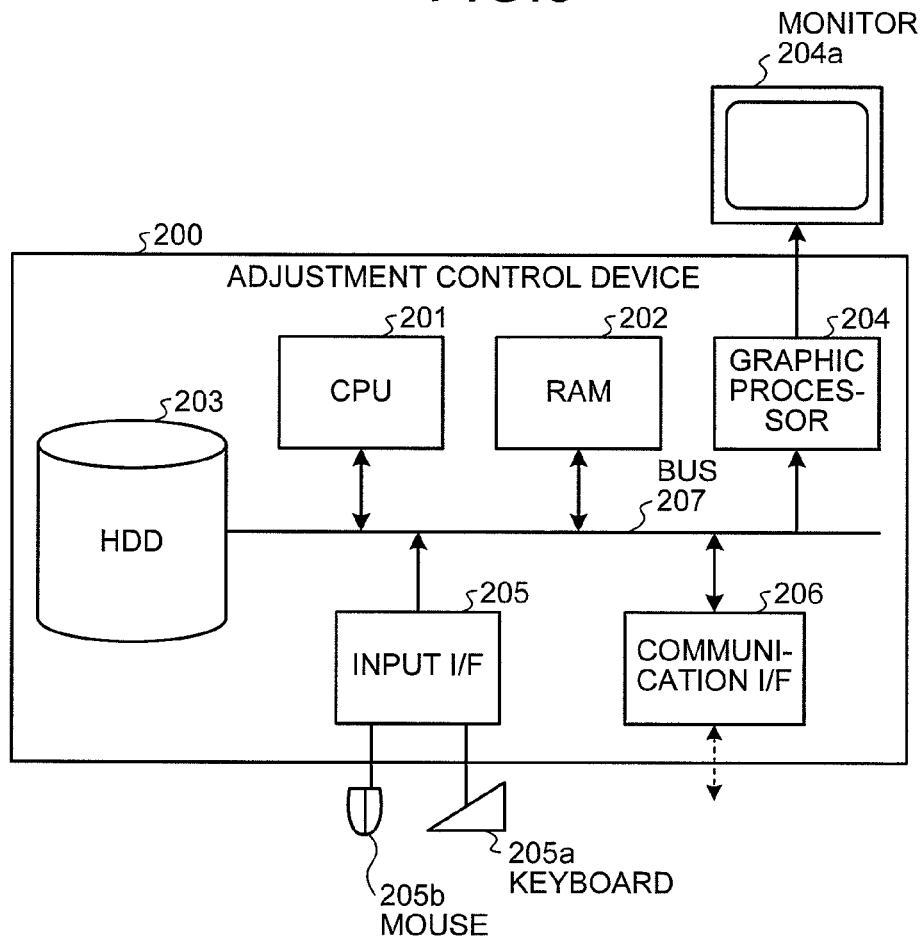
FIG. 5 is an exemplary view illustrating a hardware constitution example of an adjustment control device.

FIG. 5 is a view illustrating a hardware constitution example of an adjustment control device.

The adjustment control device 200 can be realized as a computer illustrated in FIG. 5. In that case, the adjustment control device 200 comprises a CPU 201, a RAM 202, an HDD 203, a graphic processor 204, an input I/F 205, and a communication I/F 206, and these modules are connected to each other through a bus 207.

The CPU 201 executes various programs stored in the HDD 203 to thereby control the overall operation of the adjustment control device 200. The RAM 202 temporarily stores at least a portion of the program to be executed by the CPU 201 and various data required for the processing performed by this program. The HDD 203 stores, for example, the program executed by the CPU 201 and various data required for the execution.

The graphic processor 204 is connected to a monitor 204a and displays an image on a screen of the monitor 204a in accordance with the instruction from the CPU 201. The input I/F 205 is connected to a keyboard 205a and a mouse 205b. The input I/F 205 transmits a signal from the keyboard 205a or the mouse 205b to the CPU 201 through the bus 207. The communication I/F 206 is connected to an external apparatus through a connector (not illustrated) and transmits/receives data with the external apparatus.

Figure 6:
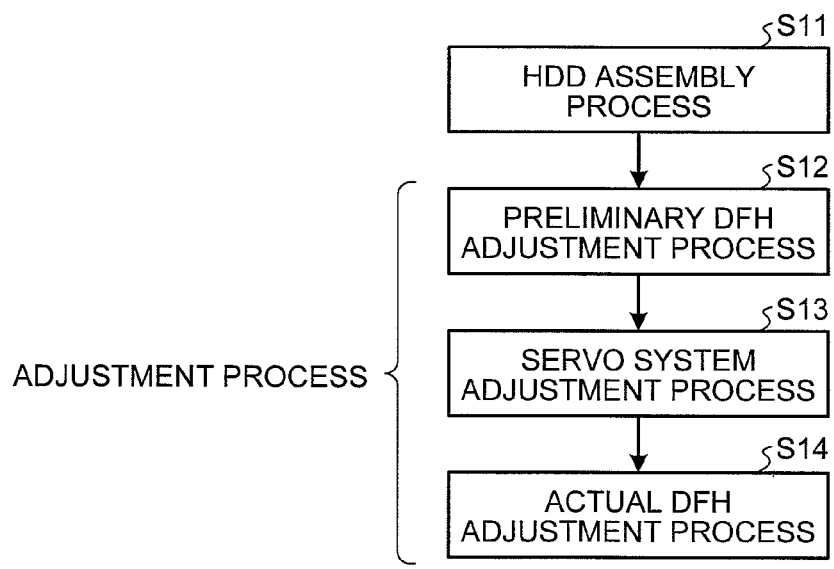
FIG. 6 is an exemplary schematic flow chart of a manufacturing process of the HDD.

FIG. 6 is a schematic flow chart of a manufacturing process of the HDD.

In the HDD adjustment system of the second embodiment, the HDD 100 in a state of being assembled with various components is thrown into an HDD assembly process (S11). In the HDD adjustment system, the control command is output in sequence from the adjustment control device 200 to the HDD 100 to be adjusted, whereby the adjustment process of the HDD 100 is executed. The adjustment operation includes a servo system adjustment process (S13) and a DFH adjustment process (corresponding to S12 and S14).

In the servo system adjustment process (S13), the servo control system of the HDD 100 is adjusted. For example, seek adjustment of the magnetic head 102 and gain adjustment in the VGA 111 are performed. In the seek adjustment of the magnetic head 102, a control signal input to the motor driver 117*a* and a drive signal output to the voice coil motor 104 are combined so that the magnetic head 102 is accurately positioned at the target position. In the gain adjustment in the VGA 111, a servo signal and recording data are read from the magnetic disk 101 by the magnetic head 102. Then, the gain control signal from the R/W channel 112 to the VGA 111 and the gain applied to the input signal in the VGA 111 are combined so that the output signal level from the VGA 111 is adjusted constant.

In the DFH adjustment process, the DFH calibration is executed. In the DFH calibration, the control value to the heater 102*a* is mainly determined, and the control value is used for adjusting the flying height of the head element. The DFH adjustment process is performed as a preliminary DFH adjustment process (S12) before the execution of the servo system adjustment process and performed as an actual DFH adjustment process (S14) after the execution of the servo system adjustment process.

In the preliminary DFH adjustment process (S12), a control value for the adjustment of the flying height of the head element is determined with rough accuracy so that the servo system adjustment process (S13) is executed with as high accuracy as possible. Meanwhile, in the actual DFH adjustment process (S14), a control value used in the actual use of the HDD 100 is more accurately determined. For example, in the preliminary DFH adjustment process, the flying height of the head element floating from the magnetic disk 101 is adjusted to 5 nm. Meanwhile, in the actual DFH adjustment process, the flying height is adjusted to 3.8 nm. In the second embodiment, both in the preliminary and actual DFH adjustment processes, not only the DFH calibration but also the processing for detecting the plastic deformation of the magnetic head 102 is executed.

Figure 7:
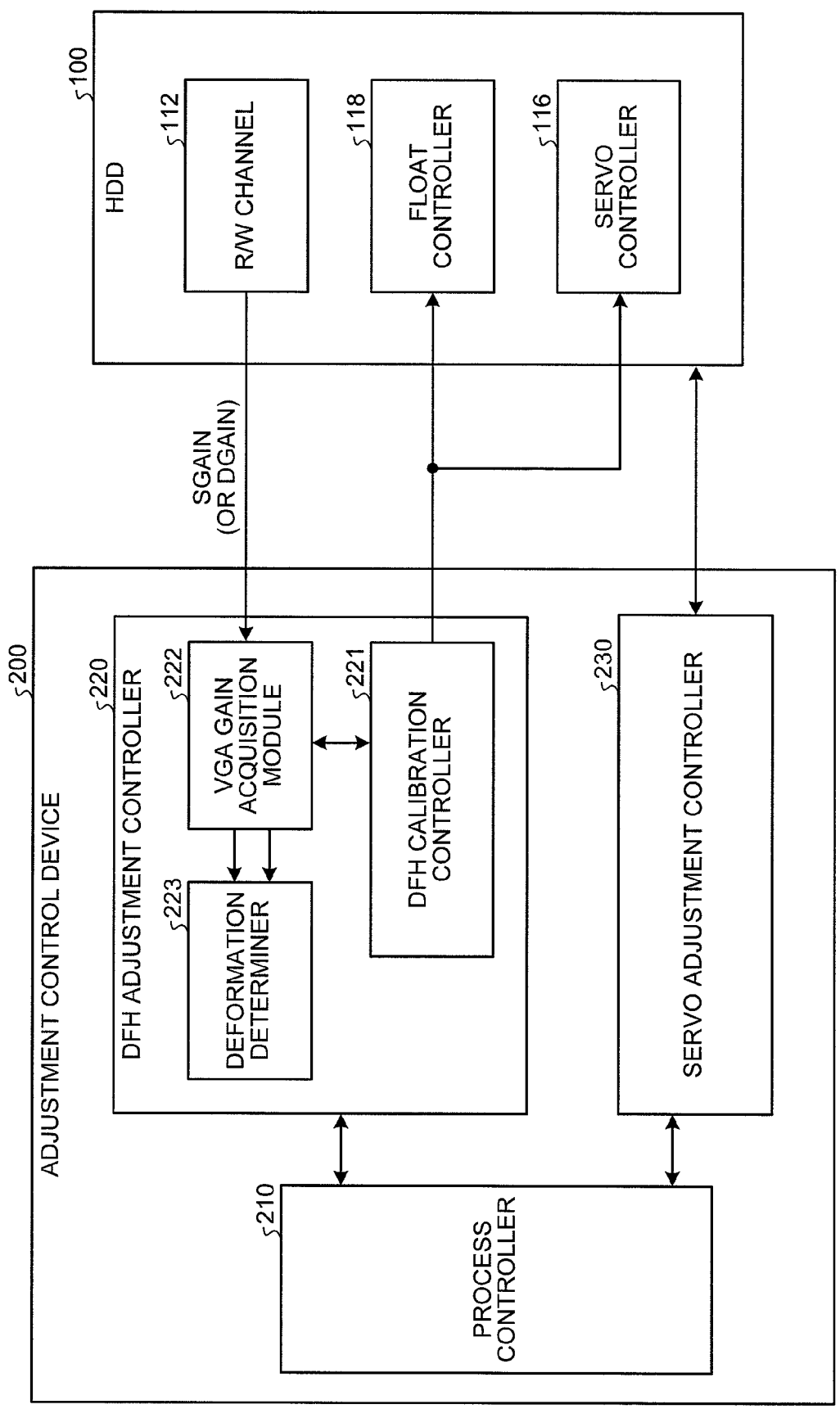
FIG. 7 is an exemplary block diagram illustrating a function for executing various adjustment operations for the HDD.

FIG. 7 is a block diagram illustrating a function of executing the various adjustment operations for the HDD.

The adjustment control device 200 comprises a process controller 210, a DFH adjustment controller 220, and a servo adjustment controller 230 as the functions for executing the various adjustment operations. For example, the CPU 201 of the adjustment control device 200 executes a predetermined program, and consequently those functions can be realized.

The process controller 210 is the function of controlling the execution order of the various adjustment operations executed by the DFH adjustment controller 220 and the servo adjustment controller 230. The DFH adjustment controller 220 is the function of executing the DFH adjustment process (corresponding to S12 and S14 of FIG. 6). The servo adjustment controller 230 is the function of executing the servo system adjustment process (corresponding to S13 of FIG. 6). The DFH adjustment controller 220 and the servo adjustment controller 230 respectively transmit the control command to the HDD 100 to thereby allow the HDD 100 to execute a predetermined operation, whereby the various adjustment operations are controlled. In the HDD 100, the main CPU 115 interprets the control command from the adjustment control device 200 and allows the float controller 118 and the servo controller 116, for example, to execute the operation corresponding to the control command.

The DFH adjustment controller 220 comprises a DFH calibration controller 221, a VGA gain acquisition module 222, and a deformation determiner 223.

The DFH calibration controller 221 transmits the control command to the HDD 100 to thereby allow the servo controller 116 to operate the voice coil motor 104 and the spindle motor 105. According to this constitution, the operations required in the DFH adjustment process, such as the rotation of the magnetic disk 101 and the reading of the signal by the magnetic head 102, are executed in the HDD 100.

The VGA gain acquisition module 222 transmits the control command to the HDD 100 to thereby allow the R/W channel 112 of the HDD 100 to transmit the value of the gain of the VGA 111 through the communication I/F 114, and, thus, to obtain the value. As described later, the gain acquisition operation in the VGA gain acquisition module 222 is performed before and after the execution of the VGA calibration, and, in addition, performed during the execution of the DFH calibration. The VGA gain acquisition module 222 further executes a calculation processing required for determination of the occurrence of the plastic deformation of the periphery of the head element.

The deformation determiner 223 receives from the VGA gain acquisition module 222 the values of the gains obtained before and after the execution of the VGA calibration and determines the occurrence of the plastic deformation of the periphery of the head element based on the values.

Figure 8:
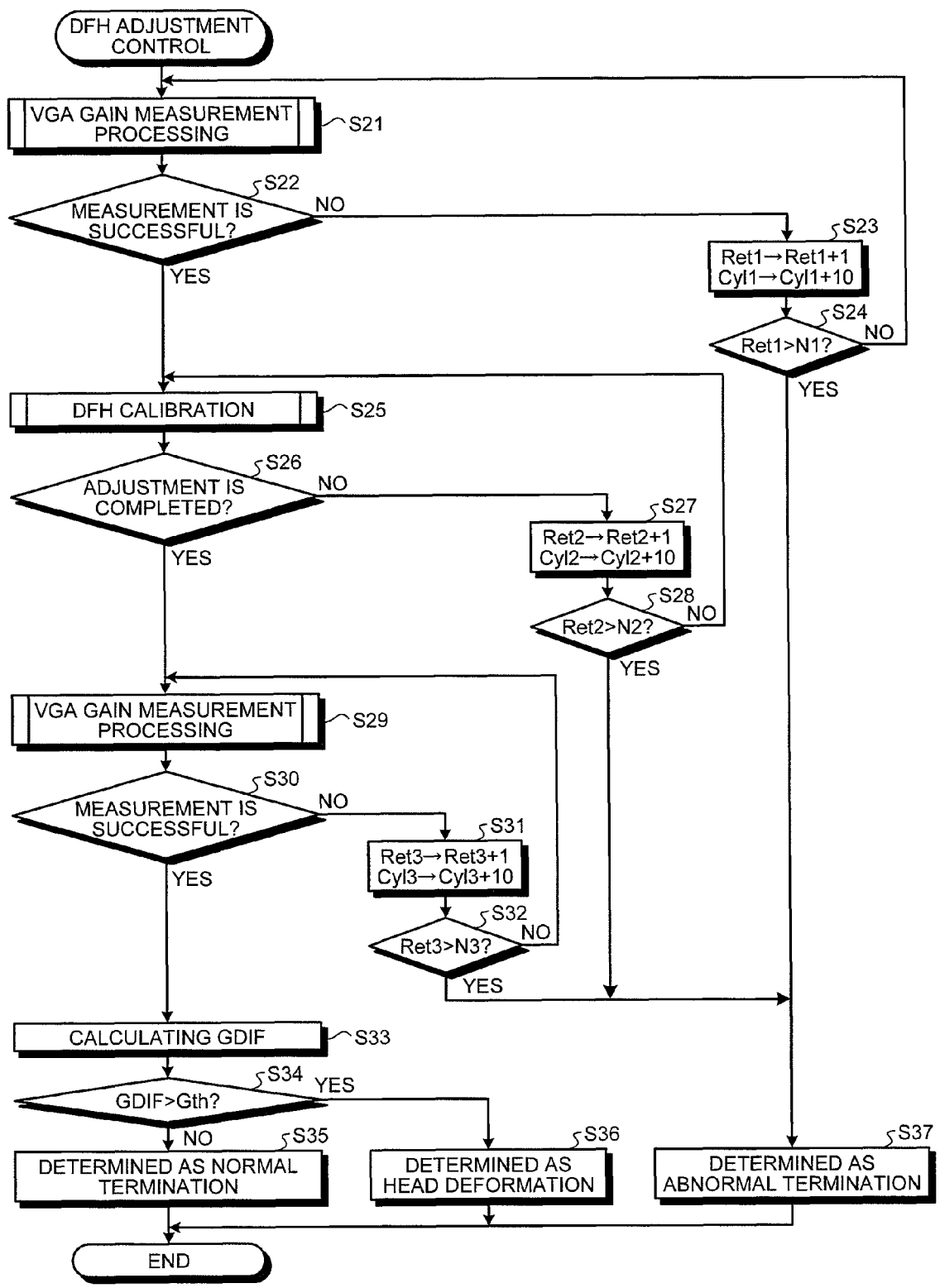
FIG. 8 is an exemplary flow chart illustrating an entire processing procedure of a DFH adjustment process.

FIG. 8 is a flow chart illustrating an entire processing procedure of the DFH adjustment process. The processing procedure illustrated in FIG. 8 is basically commonly applied to S12 and S14 of FIG. 6. However, in the execution of the process, different parameters may be used in each step.

[S21] the VGA gain measurement processing is performed as a preprocessing of the DFH calibration. In this processing, the DFH calibration controller 221 requires the HDD 100 to set the electric power supplied to the heater 102*a* to the initial value, and, at the same time, requires the HDD 100 to read a signal from the magnetic disk 101. The initial value of the electric power supplied to the heater is basically a value free from the occurrence of the expansion of the magnetic head 102. Meanwhile, a servo signal, recording data, and so on can be used as the signal required to be read. In the processing, a cylinder number Cyl1 is designated as a signal reading position. The initial value of the cylinder number Cyl1 is a value illustrating a predetermined cylinder located on the outer circumferential side of the magnetic disk 101, for example.

In the HDD 100, a signal from the position corresponding to the cylinder number Cyl1 in the magnetic disk 101 is read, and a gain is applied to the read signal in the VGA 111. The VGA gain acquisition module 222 obtains the value of the gain in the VGA 111 from the HDD 100.

[S22] The DFH calibration controller 221 determines whether or not the VGA gain measurement processing in S21 is successful. For example, when the gain cannot be obtained within a fixed time after the requirement of signal reading, the DFH calibration controller 221 determines that the measurement fails. When the measurement is successful, the processing of S25 is executed. When the measurement fails, the processing of S23 is executed.

[S23] The DFH calibration controller 221 adds "1" to the number of retry times Ret1 in the VGA gain measurement processing of S21, and, at the same time, adds a fixed value ("10" in this case) to the cylinder number Cyl1. The initial value of the number of retry times Ret1 is "0".

[S24] The DFH calibration controller 221 determines whether or not the number of retry times Ret1 after addition is more than N1 (N1 represents an integer of not less than 1).

When the number of retry times Ret1 is more than N1, the processing of S37 is executed. Meanwhile, when the number of retry times Ret1 is not more than N1, the processing of S21 is executed again using the retry frequency Ret1 after addition in S23.

[S25] The DFH calibration is executed. In this processing, the DFH calibration controller 221 allows the HDD 100 to increase the electric power supplied to the heater 102a in such a state that the magnetic disk 101 rotates and the magnetic head 102 floats from the magnetic disk 101. Further, the magnetic head 102 touches down to the magnetic disk 101, and thereafter, the electric power supplied to the heater 102a is reduced until the flying height of the head element reaches the target value. Then, the DFH calibration controller 221 allows the HDD 100 to store therein the control value that corresponds to the electric power supplied to the heater 102a at the time when the flying height of the head element is the target value.

The target flying height of the head element in the execution of the processing of S25 in the actual DFH adjustment process (S14 of FIG. 6) is set to be smaller than that in the execution of the processing of S25 in the preliminary DFH adjustment process (S12 of FIG. 6).

Figure 9:
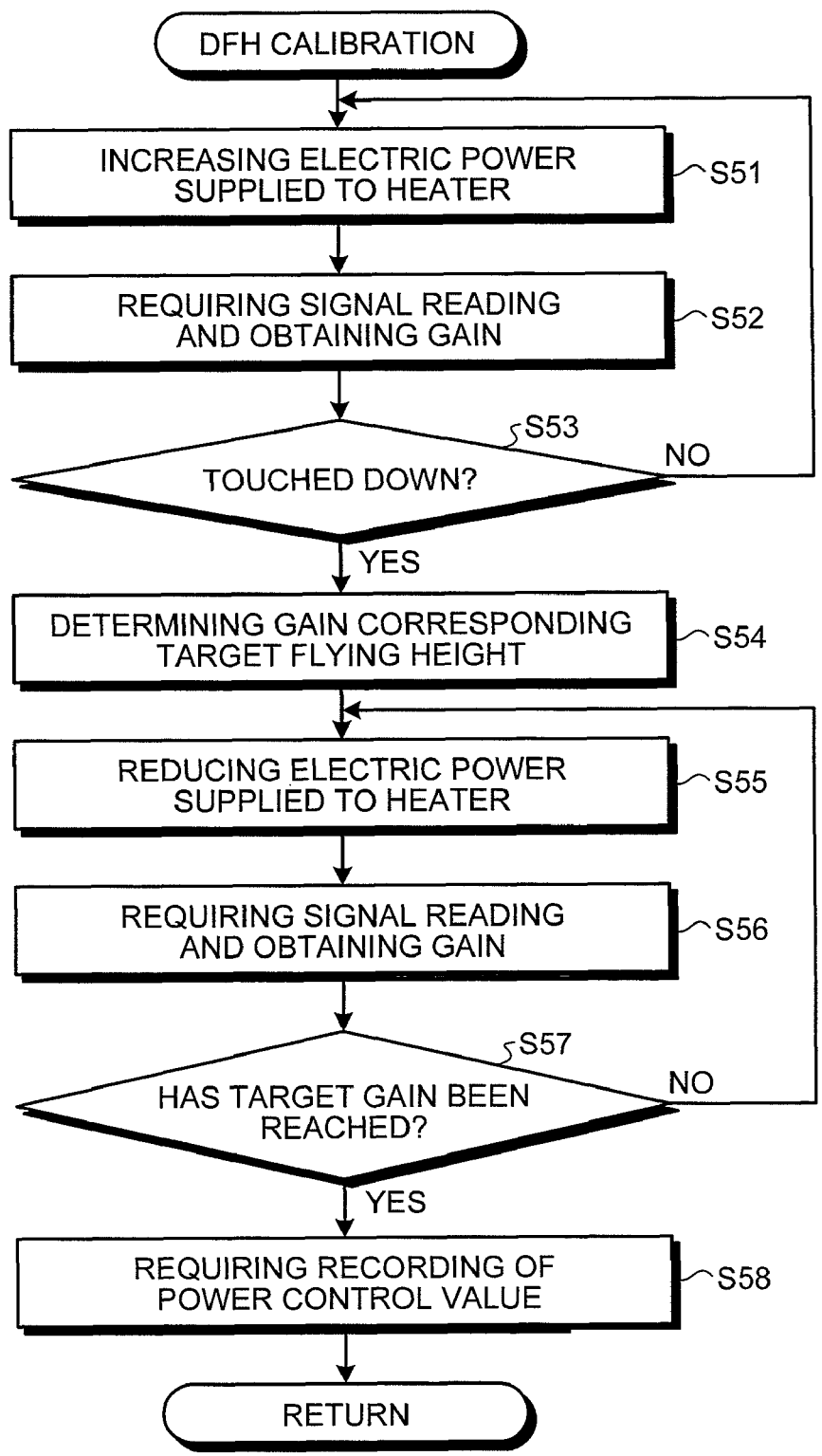
FIG. 9 is an exemplary flow chart illustrating a processing procedure of the DFH calibration.

FIG. 9 is a flow chart illustrating a processing procedure of the DFH calibration.

[S51] The DFH calibration controller 221 requires the HDD 100 to gradually increase the electric power, supplied to the heater 102a, from the initial value. The main CPU 115 of the HDD 100 controls the float controller 118 in response to the requirement and increases the electric power supplied to the heater 102a.

[S52] The DFH calibration controller 221 requires the HDD 100 to read a signal from the magnetic disk 101, and, at the same time, requires the HDD 100 to transmit the gain of the VGA 111. The signal required to be read includes a servo signal and a recording data. In the processing, a cylinder number Cyl2 is designated as the signal reading position. The initial value of the cylinder number Cyl2 is a value illustrating a predetermined cylinder located on the outer circumferential side of the magnetic disk 101, for example.

The main CPU 115 of the HDD 100 controls the servo controller 116 in response to the requirement of signal reading and positions the magnetic head 102 to the position corresponding to the cylinder number Cyl2. According to this constitution, a signal is read through the magnetic head 102, and the R/W channel 112 controls the gain of the VGA 111 in response to the level of the signal input from the magnetic head 102 to the VGA 111. At the same time, the gain of the VGA 111 is informed to the main CPU 115, and the main CPU 115 transfers the informed gain to the adjustment control device 200 through the hard disk controller 113 and the communication I/F 114. In the adjustment control device 200, the VGA gain acquisition module 222 obtains the transferred gain to inform the gain to the DFH calibration controller 221.

[S53] The DFH calibration controller 221 determines whether or not the magnetic head 102 touches down to the magnetic disk 101 based on the gain obtained in the VGA gain acquisition module 222. Usually, when the electric power supplied to the heater 102a increases, the head element is protruded to approach the magnetic disk 101, and therefore, the level of the signal to be read is increased, whereby the gain of the VGA 111 is reduced. The DFH calibration controller 221 detects the timing at which the gain is minimum and determines that the touchdown is performed at this timing.

When the magnetic head 102 touches down, the processing of S54 is executed. Meanwhile, when the magnetic head 102 does not touch down, the processing of S51 is executed again, and the electric power supplied to the heater 102a further increases.

[S54] The DFH calibration controller 221 determines the target gain amount of the GVA 111 at the time when the flying height of the head element floating from the magnetic disk 101 is the target value. The processing for determining the target gain amount is described later in FIG. 10.

[S55] The DFH calibration controller 221 requires the HDD 100 to reduce the electric power supplied to the heater 102a.

[S56] As in the procedure in S52, the DFH calibration controller 221 requires the HDD 100 to read the signal from the magnetic disk 101, and, at the same time, requires the HDD 100 to transmit the gain of the VGA 111. The gain is transmitted from the HDD 100 in response to the requirement, and the DFH calibration controller 221 obtains the gain through the VGA gain acquisition module 222.

[S57] The DFH calibration controller 221 determines whether or not the gain obtained in S56 reaches the target gain calculated in S54. When the obtained gain reaches the target amount, the processing of S58 is executed. Meanwhile, when the obtained gain does not reach the target amount, the processing of S55 is executed again, and the electric power supplied to the heater 102a is further reduced.

[S58] The DFH calibration controller 221 requires the HDD 100 to record the present power control value for controlling the electric power supplied to the heater 102a. The main CPU 115 of the HDD 100 records the present power control value, output from the float controller 118 to the electric power supplier 119, in the nonvolatile memory 115a in response to the requirement. The power control value is output to the float controller 118 and then output to the electric power supplier 119 when the signal reading from the magnetic disk 101 and the signal writing in the magnetic disk 101 are thereafter performed.

Figure 10:
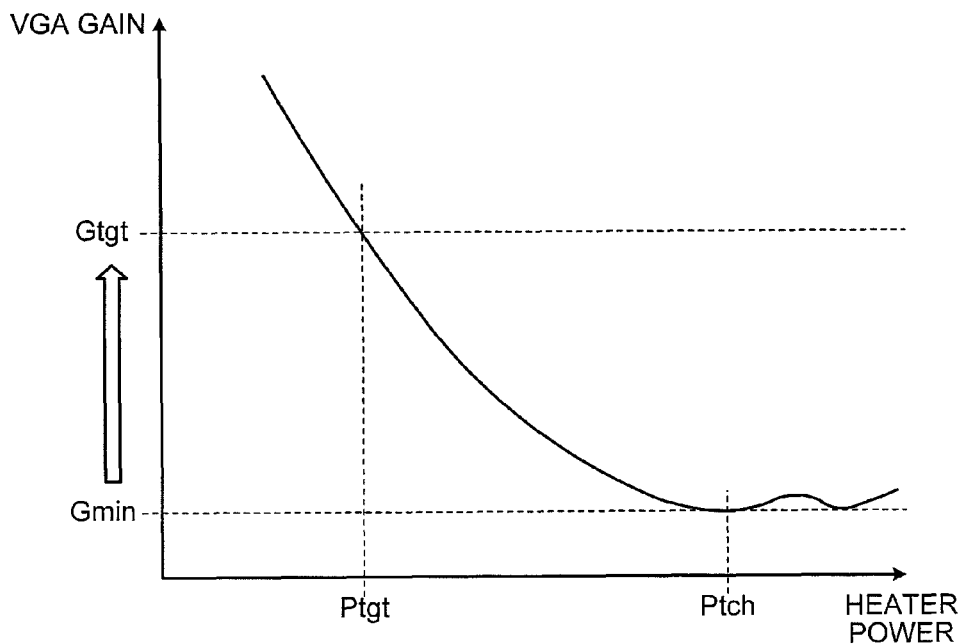
FIG. 10 is an exemplary graph illustrating a relation between an electric power supplied to a heater and a gain of a VGA.

FIG. 10 is an example of a graph illustrating a relation between the electric power supplied to the heater and the gain of the VGA.

In FIG. 10, when the power value of the electric power supplied to the heater 102a is Ptch, the magnetic head 102 touches down to the magnetic disk 101. The gain of the VGA 111 at that time takes a minimum value Gmin. In the DFH calibration, the electric power supplied to the heater 102a is gradually reduced from this state until the flying height of the head element reaches the target value. By virtue of the use of such a characteristic that the gain of the VGA 111 increases in response to floating of the head element, when the gain increases to the target value Gtgt, it can be determined that the flying height of the head element reaches the target value.

In the processing of S54 of FIG. 9, for example, a correspondence table between the gain of the VGA 111 in touchdown and the gain target value corresponding to the gain is provided. The gain target value corresponding to the gain detected in touchdown (the minimum value Gmin) is read from the correspondence table.

When the target value Gtgt of the gain is determined, the electric power supplied to the heater 102a is gradually reduced. As illustrated in FIG. 10, when the electric power supplied to the heater 102a is reduced, the level of the signal read from the magnetic disk 101 gradually increases, and the gain of the VGA 111 is gradually increased. When the gain of the VGA 111 reaches the target value Gtgt, the flying height of the head element is the target value. The main CPU 115 records the power control value in the nonvolatile memory 115a in response to the requirement from the adjustment control device 200. The power control value is output to the electric power supplier 119 in order to generate the electric power Ptgt supplied to the heater 102a at this time.

Hereinafter, description is made returning to FIG. 8.

[S26] The DFH calibration controller 221 determines whether or not the DFH calibration in S25 is normally completed. For example, during the processing of the DFH calibration, when the gain of the VGA 111 cannot be obtained from the HDD 100, it is determined that the DFH calibration is not completed.

[S27] The DFH calibration controller 221 adds "1" to the number of retry times Ret2 of the DFH calibration of S25, and, at the same time, adds a fixed value ("10" in this case) to the cylinder number Cyl2. The initial value of the number of retry times Ret2 is "0".

[S28] The DFH calibration controller 221 determines whether or not the number of retry times Ret2 after addition is more than N2 (N2 represents an integer of not less than 1). When the number of retry times Ret2 is more than N2, the processing of S37 is executed. Meanwhile, when the number of retry times Ret2 is not more than N2, the processing of S25 is executed again using the number of retry times Ret2 after addition in S27.

[S29] The VGA gain measurement processing as a post-processing of the DFH calibration is executed. This processing is basically similar to the processing of S21. Namely, the initial value of the electric power supplied to the heater 102a is set to the initial value, and, at the same time, the signal of the same kind as that in S21 is read from the magnetic disk 101. The gain of the VGA 111 corresponding to the level of the read signal is supplied to the VGA gain acquisition module 222. A cylinder number Cyl3 is designated as the signal reading position. The initial value of the cylinder number Cyl3 is a value illustrating a predetermined cylinder located on the outer circumferential side of the magnetic disk 101, for example.

[S30] The DFH calibration controller 221 determines whether or not the VGA gain measurement processing in S29 is successful. For example, as in S22, when the gain cannot be obtained within a fixed time after the requirement of signal reading, the DFH calibration controller 221 determines that the measurement fails. When the measurement is successful, the processing of S33 is executed. When the measurement fails, the processing of S31 is executed.

[S31] the DFH calibration controller 221 adds "1" to the number of retry times Ret3 of the VGA gain measurement processing of S29, and, at the same time, adds a fixed value ("10" in this case) to the cylinder number Cyl3. The initial value of the number of retry times Ret3 is "0".

[S32] The DFH calibration controller 221 determines whether or not the number of retry times Ret3 after addition is more than N3 (N3 represents an integer of not less than 1). When the number of retry times Ret3 is more than N3, the processing of S37 is executed. Meanwhile, when the number of retry times Ret3 is not more than N3, the processing of S29 is executed again using the number of retry times Ret3 after addition in S31.

[S33] The deformation determiner 223 calculates a difference absolute value Gdif of the gain obtained by the VGA gain acquisition module 222 in S21 and S29.

[S34] The deformation determiner 223 compares the calculated difference absolute value Gdif with a predetermined gain threshold value Gth (Gth>0). When the difference absolute value Gdif is not more than the gain threshold value Gth, the processing of S35 is executed. When the difference absolute value Gdif is more than the gain threshold value Gth, the processing of S36 is executed.

[S35] The deformation determiner 223 determines that the DFH adjustment processing is normally completed and notifies the fact to the process controller 210.

[S36] The deformation determiner 223 determines that the plastic deformation due to heat occurs in the magnetic head 102 and forcibly terminates the DFH adjustment processing, and, at the same time, notifies the occurrence of the plastic deformation to the process controller 210.

[S37] The DFH calibration controller 221 determines that the DFH adjustment processing is not normally executed to forcibly terminate the DFH adjustment processing, and, at the same time, notify abnormal termination to the process controller 210.

For example, when the HDD to be adjusted comprises a plurality of magnetic heads, the DFH adjustment process is performed for each magnetic head. In that case, in S36 and S37, the HDD may be set so that the magnetic heads to be adjusted are not used.

In the processing of FIG. 8, the occurrence of the plastic deformation of the magnetic head 102 can be easily determined based on a difference between the gains of the VGA 111 before and after the DFH calibration. Especially, the gain of the VGA 111 is obtained immediately before and immediately after the DFH calibration, and consequently the difference of the gains can be accurately discriminated without being affected by a change of parameters such as the signal reading operation and a change of environments. As the signal read from the magnetic disk 101 in order to obtain the gain of the VGA 111, existing signals such as a servo signal and recording data can be utilized.

There are given in the following table 1 examples of the flying height of the head element and the measurement value of the gain of the VGA 111 upon occurrence of the plastic deformation in the magnetic head 102.

TABLE 1

|  | Flying height | Sgain | Dgain |
| --- | --- | --- | --- |
| Before DFH calibration | 8.98 | 111.30 | 78.63 |
| After DFH calibration | 8.13 | 132.33 | 103.27 |

In the table 1, Sgain represents the gain of the VGA 111 in the reading of a servo signal. Dgain represents the gain of the VGA 111 in the reading of recording data. "Before DFH calibration" and "After DFH calibration" respectively correspond to the timings of S21 and S29 of FIG. 8. However, all temperatures in measurement are the same and 25° C.

As illustrated in the table 1, when the plastic deformation occurs in the magnetic head 102 by the execution of the DFH calibration, the periphery of the head element does not shrink to the original size, and thus the flying height of the head element floating from the magnetic disk 101 increases. At that time, the gain Sgain in the reading of the servo signal and the gain Dgain in the reading of the recording data are distinctly different from those before the execution of the DFH calibration.

Figure 11:
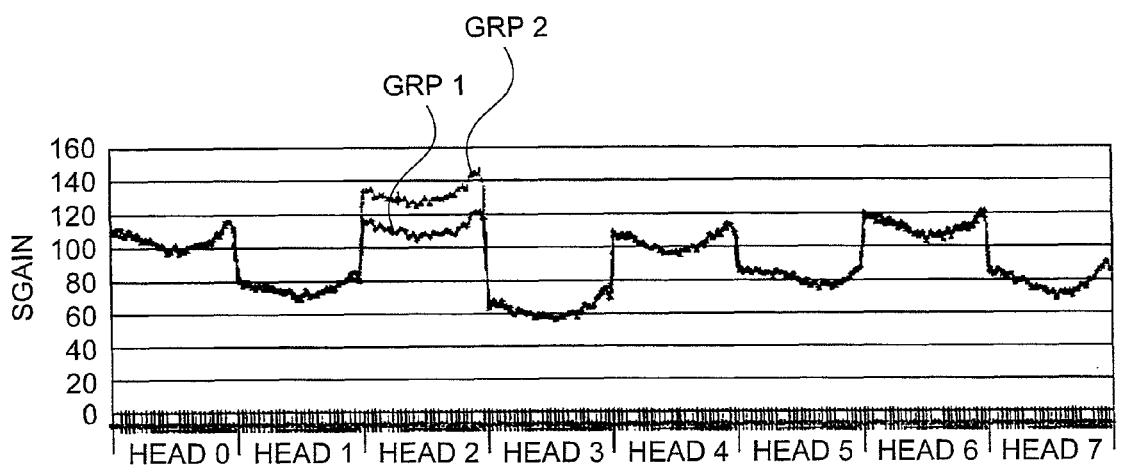
FIG. 11 is an exemplary graph illustrating a measurement result of the gain of the VGA when the HDD comprises a plurality of magnetic heads.

FIG. 11 is a graph illustrating a measurement result of the gain of the VGA when the HDD comprises a plurality of magnetic heads.

In FIG. 11, when the HDD to be adjusted comprises 8 magnetic heads Head0 to Head7, the measurement values of the gain Sgain at the time when the servo signal is read by these magnetic heads are illustrated. A graph GRP1 is obtained when the gain Sgain is measured immediately before the DFH calibration, and a graph GRP2 is obtained when the gain Sgain is measured immediately after the DFH calibration. The horizontal axis of FIG. 11 represents a zone to be subjected to the signal reading in the HDD.

In FIG. 11, only the magnetic head Head2 of the 8 magnetic heads plastically deformed by the execution of the DFH calibration. At that time, comparing the graph GRP1 and the graph GRP2, the gain Sgain corresponding to the magnetic head free from the plastic deformation is less different before and after the DFH calibration. Meanwhile, the gain Sgain corresponding to the plastically deformed magnetic head is substantially different before and after the DFH calibration.

As illustrated in the table 1 and FIG. 11, when the plastic deformation in the magnetic head 102 occurs by heating, there occurs a distinct difference between the gains of the VGA 111 before and after the occurrence of the plastic deformation. Thus, by virtue of the utilization of the difference, the occurrence of the plastic deformation can be reliably detected. By virtue of the detection method, the constitution of the HDD is not required to be substantially changed for the sake of the detection of the plastic deformation, and thus the manufacturing cost of the HDD can be reduced.

When the plastic deformation occurs in the magnetic head 102, the gain of the VGA 111 in the signal reading performed by the magnetic head 102 may be lower or higher than that before the plastic deformation. For example, when the head element is not deteriorated while the plastic deformation occurs, the flying height of the head element is reduced by the plastic deformation, and therefore, the gain of the VGA 111 is lowered. However, when the head element is deteriorated by the plastic deformation, the signal reading from the magnetic disk 101 cannot be normally performed, and therefore, while the level of the read signal is lowered, the gain of the VGA 111 is increased. The table 1 and FIG. 11 illustrate the measurement result in the latter case.

Therefore, when the occurrence of the plastic deformation is determined based on the difference between the gains of the VGA 111 measured before and after the DFH calibration, it is preferable to determine whether or not the difference value is included between a positive upper limit threshold value and a negative lower limit threshold value. However, the difference absolute value Gdif of each gain is calculated as in S33 of FIG. 8, whereby, as in S34, the occurrence of the plastic deformation can be determined using one threshold value Gth as a value for comparison.

In the processing of FIG. 8, in the measurement of the gain of the VGA 111, when the gain based on the signal read from the magnetic disk 101 cannot be obtained, a retry is performed only a predetermined number of times. When the gain measurement is retried, the cylinder numbers Cy1 to Cy13 are changed to change the signal reading position.

In the magnetic disk 101 of the HDD 100, dirt may be temporarily adhered onto the surface of the magnetic disk 101. In this case, the cylinder from which a signal is read is changed, whereby the signal is normally read, and the gain of the VGA 111 may be obtained. Thus, the execution of the retry operation can realize more reliable measurement of the gain of the VGA 111. By virtue of the retry operation, the gains based on signals read from different cylinders may be measured in S21 and S29; however, there is no particular problem.

Figure 12:
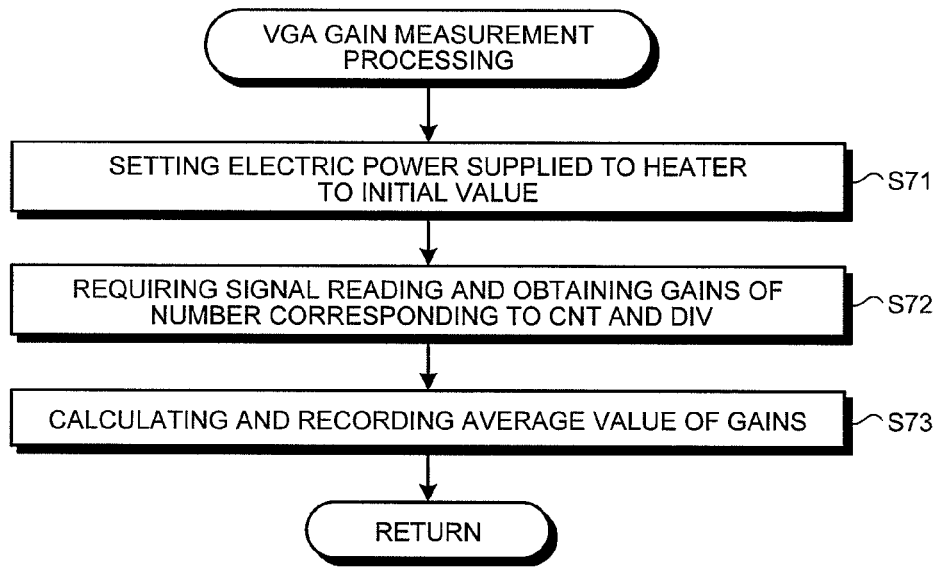
FIG. 12 is an exemplary flow chart illustrating a more specific processing procedure in a VGA gain measurement processing.

FIG. 12 is a flow chart illustrating a more specific processing procedure in the VGA gain measurement processing. The processing procedure of FIG. 12 can be applied to S21 and S29 of FIG. 8.

[S71] The DFH calibration controller 221 requires the HDD 100 to set the electric power, supplied to the heater 102a, to the initial value.

[S72] The DFH calibration controller 221 requires the HDD 100 to read a signal from the magnetic disk 101. The VGA gain acquisition module 222 obtains the gain of the VGA 111 in the signal reading from the HDD 100.

The DFH calibration controller 221 designates, for the HDD 100, the number of measurement rounds Cnt and a division number Div as parameters requiring signal reading. The measurement round number Cnt represents the number of reading of a signal from a designated cylinder. The division number Div represents the number of dividing the circumference of the designated cylinder into a plurality of regions.

In the HDD 100, a signal is read from each division region obtained by dividing the cylinder into the division number Div, and the gain of the VGA 111 is transmitted to the adjustment control device 200 for each reading of the signal from each division region. Such an operation is repeated the number of times corresponding to the measurement round number Cnt. Thus, the VGA gain acquisition module 222 obtains the gain with the number corresponding to the number of "Div× Cnt" from the HDD 100.

[S73] The VGA gain acquisition module 222 calculates an average value of the gains obtained in S72 and temporarily stores the average value in the RAM 202. The gain value recorded at that time is utilized in S33 of FIG. 8.

Figure 13:
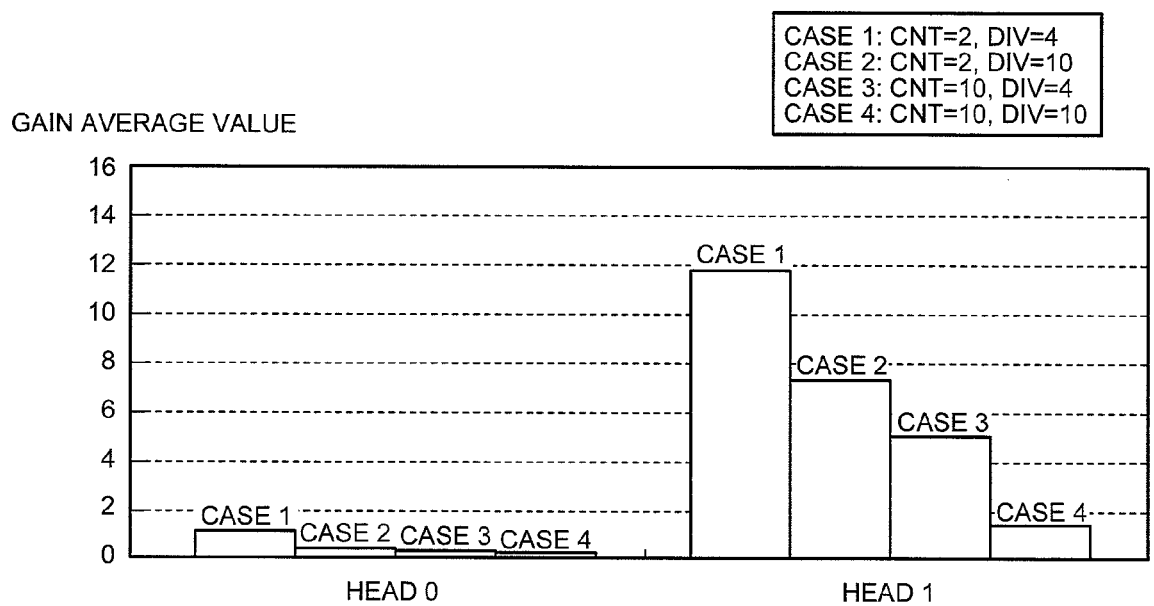
FIG. 13 is an exemplary graph illustrating an example of a gain measurement result when a parameter in signal reading requirement is different.

FIG. 13 is a graph illustrating an example of the gain measurement result when a parameter in the signal reading requirement is different.

The graph of FIG. 13 illustrates the average value of the gains calculated in S73 when the signal is read from the magnetic disk by two magnetic heads Head0 and Head1. In this example, relative to the magnetic head corresponding to Head0, the magnetic head corresponding to Head0 is inferior in characteristics, and the level of the signal read by Head1 is low. Case1 to Case4 in FIG. 13 represent the measurement results in a case in which the combination of the measurement round number Cnt and the division number Div is different.

According to FIG. 13, the larger each value of the measurement round number Cnt and the division number Div, the smaller the difference between the gains based on the signals read by the respective magnetic heads. This fact illustrates that variation of the gains, measured for each reading of the signals from the regions obtained by dividing the cylinder is rendered uniform by increasing the measurement round number Cnt and the division number Div. Thus, in S72 of FIG. 12, the measurement accuracy of the gain is improved by increasing the measurement round number Cnt and the division number Div, and consequently the detection accuracy of the plastic deformation of the magnetic head 102 is improved.

In the second embodiment, the DFH adjustment controller 220 of the adjustment control device 200 has the control function of the DFH calibration corresponding to S25 of FIG. 8. However, the HDD 100 itself may have the control function. In that case, the main CPU 115 of the HDD 100 performs specified firmware, whereby the DFH calibration is automatically executed in the HDD 100. The adjustment control device 200 receives the gain of the VGA 111 in a case, in which the signal is read when the electric power supplied to the heater 102a is the initial electric power, from the HDD 100 immediately before and immediately after the DFH calibration. The determination processing in the deformation determiner 223 is then performed based on each received gain. The signal reading operation for receiving the gain of the VGA 111 may be executed in the HDD 100 in response to the requirement from the adjustment control device 200.

Third Embodiment

In the second embodiment, the various adjustment operations in the HDD are executed under the control of the adjustment control device connected to the outside of the HDD. Meanwhile, in the following third embodiment, not the adjustment control device but the HDD itself has the function of controlling the adjustment operation.

Figure 14:
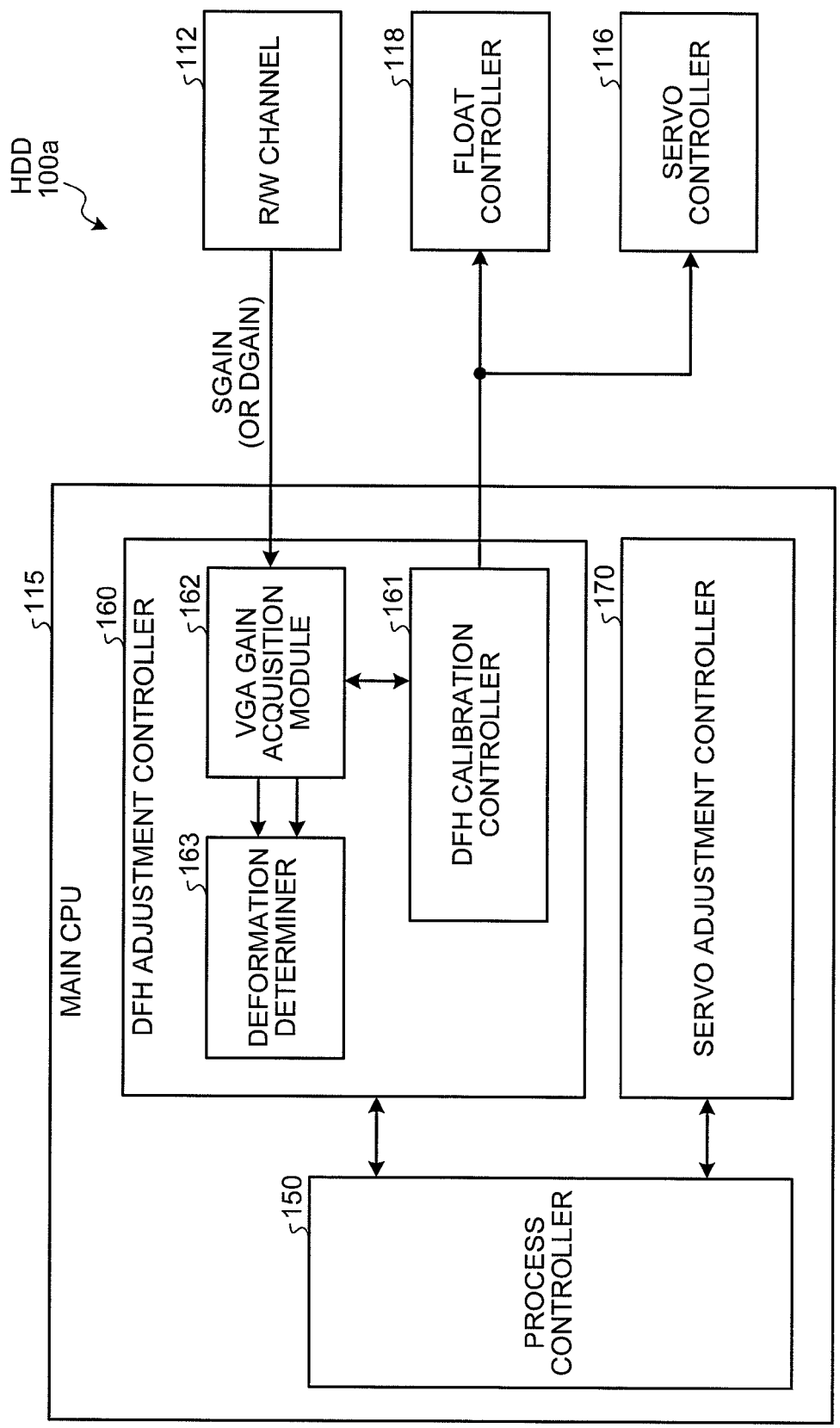
FIG. 14 is an exemplary block diagram illustrating a function of the HDD according to a third embodiment of the invention.

FIG. 14 is a block diagram illustrating a function of the HDD according to the third embodiment of the invention. The HDD of the third embodiment has a hardware configuration similar to that of the HDD of the second embodiment illustrated in FIG. 3. Thus, the components of FIG. 14 corresponding to those of FIG. 3 are assigned the same reference numerals.

A HDD 100a illustrated in FIG. 14 comprises a process controller 150, a DFH adjustment controller 160, and a servo adjustment controller 170 as control functions for executing the adjustment process illustrated in FIG. 6. The DFH adjustment controller 160 comprises a DFH calibration controller 161, a VGA gain acquisition module 162, and a deformation determiner 163. For example, the main CPU 115 executes the firmware stored in the nonvolatile memory 115a, whereby these functions are realized.

The process controller 150, the DFH adjustment controller 160, and the servo adjustment controller 170 of the HDD 100a basically respectively execute the same processing as that executed by the process controller 210, the DFH adjustment controller 220, and the servo adjustment controller 230 of the adjustment control device 200 illustrated in FIG. 7. The DFH calibration controller 161, the VGA gain acquisition module 162, and the deformation determiner 163 of the DFH adjustment controller 160 basically respectively execute the same processing as that executed by the DFH calibration controller 221, the VGA gain acquisition module 222, and the deformation determiner 223 of the adjustment control device 200 illustrated in FIG. 7. However, the case of FIG. 14 is different from the case of FIG. 7 in that the DFH adjustment controller 160 and the servo adjustment controller 170 directly control each module in the HDD 100a, such as the R/W channel 112, the float controller 118, and the servo controller 116.

In the HDD 100a, those control functions execute the adjustment process similar to that executed by the adjustment control device 200 of the second embodiment, that is, the temporary DFH adjustment process (corresponding to S12 of FIG. 6), the servo system adjustment process (corresponding to S13), and the actual DFH adjustment process (corresponding to S14). According to this constitution, the plastic deformation of the magnetic head 102 can be reliably determined without substantially changing the internal constitution of the HDD 100a.

Regarding the functions illustrated in FIG. 14, an adjustment control device (for example, a host device) connected to the outside of the HDD 100a may have the function of controlling the execution order of the adjustment process executed by the process controller 150. In that case, for example, the adjustment control device requires the main CPU 115 of the HDD 100a to execute the temporary adjustment process, the servo system adjustment process, and the actual DFH adjustment process. The respective processes themselves are realized by processing in the HDD 100a. When the process is completed, the completion notification is transmitted to the adjustment control device. The adjustment control device having received the completion notification requires the HDD 100a to execute the next process.

According to an embodiment of the invention, the device for a magnetic storage device, or the magnetic storage device, is able to detect plastic deformation of a periphery of a head element caused by heating with a heater, without increasing the cost for each device in the magnetic storage device.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A test device for a magnetic storage device, comprising: a signal level receiver configured to receive a signal level corresponding with a level of a signal read from a magnetic disk through a magnetic head of the magnetic storage device from the magnetic storage device, at a first time when a power of an initial electric power amount substantially equal to or greater than 0 is supplied to a heater in the magnetic head and at a second time when the electric power supplied to the heater comprises the initial electric power after the electric power supplied to the heater has been increased from the initial electric power amount, a periphery of a head element in the magnetic head has been expanded due to heat from the heater, and the head element has been protruded toward a side of the magnetic disk of the magnetic storage device;
wherein
the signal level receiver is configured to request the magnetic storage device to read a signal from different positions on a same cylinder in the magnetic disk using the magnetic head at the first and the second time, to receive the signal levels corresponding with the signals read from the different positions at the first time and the second time, and to calculate an average value of the received signal levels at the time first time and the second time, and
a determiner configured to determine whether plastic deformation has occurred in the periphery of the head element based on a difference between the average values calculated at the first and second times.

2. The test device of claim 1 for a magnetic storage device, further comprising:
a head protrusion controller configured to increase the electric power supplied to the heater substantially higher than the initial electric power amount and to request the magnetic storage device to move the head element to contact with a surface of the magnetic disk, wherein
the first time is before starting the head element movement, and the second time is after termination of the head contacting with the surface of the magnetic disk.

3. The test device of claim 2 for a magnetic storage device, wherein
the head protrusion controller is configured to decrease the electric power supplied to the heater when the head element is in contact with the surface of the magnetic disk surface and to cause the magnetic storage device to detect a predetermined power amount supplied to the heater while reading the signal, and
the second time is after termination of the predetermined power amount detection.

4. The test device of claim 1 for a magnetic storage device, further comprising:
a signal level controller configured to control the level of the signal read from the magnetic disk through the magnetic head to be substantially constant, wherein
the received signal level corresponds with a gain in the signal level controller to the signal while reading the signal from the magnetic disk.

5. The test device of claim 1 for a magnetic storage device, wherein the received signal level corresponds with a level of a servo signal read from the magnetic disk.

6. The test device of claim 1 for a magnetic storage device, wherein the received signal level corresponds with a signal level while reading data recorded in the magnetic disk other than a servo signal.

7. The test device of claim 1 for a magnetic storage device, wherein the signal level receiver is configured to change a position where a signal is read from the magnetic disk by the magnetic head if the signal level receiver fails to receive the signal level from the magnetic storage device at least one of the first and second times, and to retry to receive a signal level from the magnetic storage device.

8. A test device for a magnetic storage device, comprising:
a signal level receiver configured to receive a signal level corresponding with a level of a signal read from a magnetic disk through a magnetic head of the magnetic storage device from the magnetic storage device, at a first time when a power of an initial electric power amount substantially equal to or greater than 0 is supplied to a heater in the magnetic head and at a second time when the electric power supplied to the heater comprises the initial electric power after the electric power supplied to the heater has been increased from the initial electric power amount, a periphery of a head element in the magnetic head has been expanded due to heat from the heater, and the head element has been protruded toward a side of the magnetic disk of the magnetic storage device;
wherein
the signal level receiver is configured to request the magnetic storage device to read a signal a plurality of times at the first time and the second time from a same cylinder in the magnetic disk using the magnetic head, to receive the signal levels corresponding with the signals read for the plurality of times at the first time and the second time, and to calculate an average value of the received signal levels read for the plurality of times at the first time and the second time, and
a determiner configured to determine whether plastic deformation has occurred in the periphery of the head element based on a difference between the average values calculated at the first and second times.

9. A magnetic storage device, comprising:
a signal level receiver configured to receive a signal level corresponding with a level of a signal read from a magnetic disk through a magnetic head, at a first time when a power of an initial electric power amount equal to or greater than 0 is supplied to a heater in the magnetic head and at a second time when the electric power supplied to the heater comprises to the initial electric power amount after the electric power supplied to the heater has been increased from the initial electric power amount, a periphery of a head element in the magnetic head has been expanded due to heat from the heater, and the head element has been protruded toward a magnetic disk side;
wherein
the signal level receiver is configured to cause the magnetic head to read a signal from different positions on a same cylinder in the magnetic disk at the first time and the second time, to receive the signal levels corresponding with the signals read from the different positions at the first time and the second time, and to calculate an average value of the received signal levels at the time first time and the second time, and
a determiner configured to determine whether plastic deformation has occurred in the periphery of the head element based on a difference between the average values calculated at the first and second times.

10. The magnetic storage device of claim 9, further comprising:
a head protrusion controller configured to increase the electric power supplied to the heater substantially higher than the initial electric power amount and to control the head element into contact with a surface of the magnetic disk, wherein
the first time is before starting the head element control, and the second time is after termination of the head contacting with the surface of the magnetic disk.

11. The magnetic storage device of claim 10, wherein
the head protrusion controller is configured to decrease the electric power supplied to the heater when the head element is in contact with the surface of the magnetic disk surface and to detect a predetermined power amount supplied to the heater while reading the signal, and
the second time is after termination of the predetermined power amount detection.

12. The magnetic storage device of claim 9, further comprising:
a signal level controller configured to control the level of the signal read from the magnetic disk through the magnetic head to be substantially constant, wherein
the received signal level corresponds with a gain in the signal level controller to the signal while reading the signal from the magnetic disk.

13. The magnetic storage device of claim 9, wherein the received signal level corresponds with a level of a servo signal read from the magnetic disk.

14. The magnetic storage device of claim 9, wherein the received signal level corresponds with a signal level while reading data recorded in the magnetic disk other than a servo signal.

15. The magnetic storage device of claim 9, wherein the signal level receiver is configured to change a position where a signal is read from the magnetic disk by the magnetic head if the signal level receiver fails to receive the signal level at least one of the first and second times, and to retry to receive a signal level.

16. A magnetic storage device, comprising:
a signal level receiver configured to receive a signal level corresponding with a level of a signal read from a magnetic disk through a magnetic head of the magnetic storage device from the magnetic storage device, at a first time when a power of an initial electric power amount substantially equal to or greater than 0 is supplied to a heater in the magnetic head and at a second time when the electric power supplied to the heater comprises the initial electric power after the electric power supplied to the heater has been increased from the initial electric power amount, a periphery of a head element in the magnetic head has been expanded due to heat from the heater, and the head element has been protruded toward a side of the magnetic disk of the magnetic storage device;

wherein the signal level receiver is configured to request the magnetic storage device to read a signal a plurality of times at the first time and the second time from a same cylinder in the magnetic disk using the magnetic head, to receive the signal levels corresponding with the signals read for the plurality of times at the first time and the second time, and to calculate an average value of the received signal levels read for the plurality of times at the first time and the second time, and a determiner configured to determine whether plastic deformation has occurred in the periphery of the head element based on a difference between the average values calculated at the first and second times.

17. A method of manufacturing a magnetic storage device, comprising assembling the magnetic storage device and testing the assembled magnetic storage device, the assembling comprising:

receiving a detection value corresponding with a level of a signal read from a magnetic disk of the magnetic storage device through a magnetic head of the magnetic storage device at a timing at which an initial electric power of a power value equal to or greater than 0 is supplied to a heater in the magnetic head, receiving the detection value at which the electric power supplied to the heater is returned to the initial electric power after the electric power supplied to the heater has been increased from the initial electric power, a periphery of a head element in the magnetic head has been expanded due to heating by the heater, and the head element has been protruded toward a side of the magnetic disk, and determining by a determiner whether or not plastic deformation has occurred in the periphery of the head element based on a difference between the detection values obtained in the first and second receiving, wherein the first receiving and second receiving each comprising:

reading a signal from different positions on a same cylinder in the magnetic disk using the magnetic head and receiving detection values corresponding with signals read from the different positions, or reading a signal a plurality of times from a same cylinder in the magnetic disk using the magnetic head and receiving detection values corresponding with signals read for the plurality of times, and calculating an average value of the detection values, and wherein the determining comprises determining whether the plastic deformation has occurred in the periphery of the head element based on a difference between average values calculated in the first receiving and the second receiving.

18. The method of claim 17, further comprising increasing the electric power supplied to the heater substantially higher than the initial electric power and moving the head element to contact with a surface of the magnetic disk, wherein the first receiving is performed before starting the head element movement, and the second receiving is performed after termination of the head contacting with the surface of the magnetic disk.

19. The method of claim 17, further comprising controlling by a signal level controller the level of the signal read from the magnetic disk through the magnetic head to be substantially constant, wherein the detection value corresponds with a gain in the signal level controller to the signal while reading the signal from the magnetic disk.

20. The method of claim 17, wherein the detection value corresponds with a level of a servo signal read from the magnetic disk.

21. The method of claim 17, wherein the detection value corresponds with a signal level while reading data recorded in the magnetic disk other than a servo signal.

22. The method of claim 17, further comprising:

changing a position where a signal is read from the magnetic disk by the magnetic head if no detection value is received from the magnetic storage device in at least one of the first and second receiving; and retrying to receive a detection value.

* * * * *